United States Patent [19]

Yamazaki et al.

[11] Patent Number: 5,810,917

[45] Date of Patent: Sep. 22, 1998

[54] WATER-BASED RECORDING MAGENTA INK COMPOSITION AND INK-JET RECORDING PROCESS

[75] Inventors: Hideto Yamazaki; Masaya Fujioka; Takeo Kitahara; Masahito Kato, all of Nagoya; Shunichi Higashiyama, Yotsukaichi, all of Japan

[73] Assignee: Brother Kogyo Kabushiki Kaisha, Nagoya, Japan

[21] Appl. No.: 889,129

[22] Filed: Jul. 7, 1997

[30]     Foreign Application Priority Data

| Jul. 8, 1996 | [JP] | Japan | 8-177724 |
| Jul. 19, 1996 | [JP] | Japan | 8-190335 |
| Jul. 24, 1996 | [JP] | Japan | 8-194628 |

[51] Int. Cl.$^6$ ................................................ C09D 11/02
[52] U.S. Cl. ...................... 106/31.58; 106/31.47
[58] Field of Search ............................. 106/31.47, 31.58, 106/31.27

[56]     References Cited

U.S. PATENT DOCUMENTS

| 5,016,028 | 5/1991 | Temple | 346/140 R |
| 5,207,824 | 5/1993 | Moffatt et al. | 106/31.58 |
| 5,476,541 | 12/1995 | Tochihara | 106/31.58 |
| 5,534,051 | 7/1996 | Lauw | 106/31.49 |
| 5,536,306 | 7/1996 | Johnson et al. | 106/31.49 |
| 5,607,502 | 3/1997 | Hassenruck et al. | 106/31 |
| 5,622,549 | 4/1997 | Yui et al. | 106/31.58 |
| 5,626,655 | 5/1997 | Pawlowski et al. | 106/31.43 |
| 5,667,569 | 9/1997 | Fujioka | 106/31.58 |

FOREIGN PATENT DOCUMENTS

| 2-150355 | 6/1990 | Japan . |

*Primary Examiner*—Helene Klemanski
*Attorney, Agent, or Firm*—Oliff & Berridge, PLC

[57]     ABSTRACT

A water-based recording magenta ink composition comprises a magenta dye dissolved in a mixed solvent of water and a water-soluble organic solvent. The magenta dye comprises Color Index Number Acid Red 52 and the water-soluble organic solvent comprises at least one of 2-pyrrolidinone, β-thiodiglycol and 1,5-pentanediol.

19 Claims, No Drawings

WATER-BASED RECORDING MAGENTA INK COMPOSITION AND INK-JET RECORDING PROCESS

BACKGROUND OF THE INVENTION

1. Field of the Invention

This invention relates to a water-based recording magenta ink composition, and an ink-jet recording process.

2. Description of the Related Art

Ink-jet recording is a system in which ink droplets are formed by ink ejection methods of various types (e.g., a system utilizing electrostatic attraction, a system in which mechanical vibration or displacement is imparted to ink by the use of a piezoelectric device, and a system in which ink is heated to cause it to bubble and a pressure produced when it bubbles is utilized), and part or the whole of ink droplets is caused to adhere to recording mediums such as paper to make a record.

As ink compositions used in such ink-jet recording systems, ink compositions making use of dyes as colorants (i.e., dye ink compositions) and ink compositions making use of pigments (i.e., pigment ink compositions) have been made available in the art.

Ink compositions for ink-jet recording are required to have various performances such that they cause no clogging at nozzles and in ink channels of the head of a recording apparatus, cause no changes in properties and no deposition of solid matter during their storage, give recorded images having sharp color tones and sufficiently high densities, enable recording without limitation on the type of recording mediums, have a high rate of fixing to recording mediums, having excellent water fastness, weather resistance, solvent resistance and abrasion resistance, give recorded images having a good resolution, and have values of physical properties such as viscosity and surface tension within proper ranges.

Pigments have water fastness and weather resistance superior to dyes, and hence they are widely used in the field of coating materials or the like. Since, however, pigments are not dissolved in ink mediums but dispersed therein, the pigment ink compositions have a poor liquid stability and, during their storage for a long period of time, the dispersion of pigment may become unstable to cause agglomeration. Hence, compared with dye ink compositions, pigment ink compositions tend to cause clogging at nozzles and in ink channels of the head of an ink-jet printer. Accordingly, there are only few examples in which the pigment ink compositions have been commerciallized as inks for ink-jet printers, and many of them are still in the stage of development.

On the other hand, dyes are, though having water fastness and weather resistance inferior to pigments, completely dissolved in ink mediums, and hence the dye ink compositions do not tend to cause clogging at nozzles and in ink channels of the head of the ink-jet printer, also having a much better liquid stability than the pigment ink compositions. Accordingly, many types of dye ink compositions have been commerciallized as inks for ink-jet printers. Among such dye ink compositions, water-based ink compositions prepared by dissolving dyes in water are prevailing in the market. As the water-based ink compositions, those in which water-soluble dyes having various chemical structures are dissolved in water or mixed solvents of water and water-soluble organic solvents and various additives are optionally added are chiefly used at present and are commerciallized.

When full-color recorded images are reproduced using water-based dye ink compositions, four primary color inks, i.e., yellow ink, magenta ink, cyan ink and additionally black ink are used, and color tones of recorded images are determined by subtractive color mixing. In order to give recorded images having a sharp color tone as one of performances of the above inks, these inks are also required to form ideal primary colors of yellow (Y), magenta (M), cyan (C) and black (Bk) whose hues each have no other color tint.

However, even such water-based dye ink compositions thus commerciallized can not be said to be satisfactory in respect of color balance between the colors of yellow (Y), magenta (M) and cyan (C) or in respect of sharpness of prints. Various improvements have been made, but are still unsatisfactory. In particular, with regard to magenta, many have colors close to red (R).

SUMMARY OF THE INVENTION

The present invention was made in order to solve the above problems. Accordingly, an object of the present invention is to provide a water-based recording magenta ink composition that has a superior liquid stability and can obtain sharp recorded images having a good color tone as magenta color, and also to provide an ink-jet recording process that can enjoy a superior liquid stability, can obtain sharp recorded images having a good color tone as magenta color and may cause no ejection failure.

To achieve the above object, the present invention provides a water-based recording magenta ink composition comprising a magenta dye dissolved in a mixed solvent of water and a water-soluble organic solvent; wherein the magenta dye comprises Color Index Number Acid Red 52 and the water-soluble organic solvent comprises at least one of 2-pyrrolidinone, β-thiodiglycol and 1,5-pentanediol.

The present invention also provides an ink-jet recording process comprising jetting a water-based recording ink composition to a recording medium in the form of droplets to make a record, wherein the water-based recording ink composition comprises a water-based recording magenta ink composition comprising a magenta dye dissolved in a mixed solvent of water and a water-soluble organic solvent; the magenta dye comprising Color Index Number Acid Red 52 and the water-soluble organic solvent comprising at least one of 2-pyrrolidinone, β-thiodiglycol and 1,5-pentanediol.

These and other objects, features and benefits of the present invention are described in or will become apparent from the following detailed description of the invention.

DETAILED DESCRIPTION OF THE INVENTION

The water-based recording magenta ink composition of the present invention comprises a magenta dye dissolved in a mixed solvent of water and a water-soluble organic solvent, and is characterized in that the magenta dye comprises Color Index Number Acid Red 52 and the water-soluble organic solvent comprises at least one of 2-pyrrolidinone, β-thiodiglycol and 1,5-pentanediol. Thus, the use of Color Index Number Acid Red 52 as the magenta dye and the use of at least one of 2-pyrrolidinone, β-thiodiglycol and 1,5-pentanediol as the water-soluble organic solvent makes it possible to ensure a superior liquid stability and obtain prints of sharp recorded images having a good color tone as magenta color.

The Color Index Number Acid Red 52 used as the magenta dye in the present invention is a dye that can give a sharper color than other water-based acid dyes and water-based direct dyes and also give a good color tone as magenta color. Hence, the water-based recording magenta ink composition of the present invention makes it possible to print images having a sharp magenta color.

Such Color Index Number Acid Red 52 may preferably be contained in the water-based recording magenta ink composition in an amount of from 0.1 to 5% by weight, and preferably from 0.5 to 3% by weight, while conventional water-soluble dyes are contained in ink compositions in an amount of about 0.1 to 10% by weight. This is because the ink composition of the present invention, even when used in the former ranges, can impart sufficient image density and sharp hues to images recorded on recording mediums.

In the present invention, a conventional known dye(s) may be used in combination with the Color Index Number Acid Red 52 so long as the benefits of the present invention is not damaged.

In the water-based recording magenta ink composition of the present invention, a mixed solvent of water and a water-soluble organic solvent is used in order to dissolve the magenta dye described above. Here, the water-soluble organic solvent is used chiefly in order to prevent the ink composition from drying, and polyhydric alcohols are widely used in conventional cases. In the present invention, however, at least one of 2-pyrrolidinone, β-thiodiglycol and 1,5-pentanediol is used. Because of use of such a specific organic solvent, a superior liquid stability can be imparted to the water-based recording magenta ink composition.

The water-soluble organic solvent may preferably be contained in the water-based recording magenta ink composition in an amount of from 5 to 50% by weight, and more preferably from 5 to 30% by weight. This is because, if it is contained in an amount less than 5% by weight, the ink composition can not be well prevented from drying, and, if it is in an amount more than 50% by weight, the ink composition may permeate into the recording medium at a low rate to bring about a high possibility of problems about, e.g., ink-drying time on the recording medium, tending to make it difficult for the ink composition to be jetted from the ink-jet head. Thus, when it is contained in an amount of from 5 to 50% by weight, the water-based recording magenta ink composition can have a superior liquid stability, can provide prints of sharp recorded images having a good color tone as magenta color and can be fixed onto the magenta dye at a high rate.

In the case when 2-pyrrolidinone is used as the water-soluble organic solvent, the 2-pyrrolidinone may preferably be contained in the water-based recording magenta ink composition in an amount of from 5 to 50% by weight, and more preferably from 5 to 30% by weight, for the same reason as explained above with respect to the content of the water-soluble organic solvent in the ink composition.

In the case when β-thiodiglycol is used as the water-soluble organic solvent, the β-thiodiglycol may preferably be contained in the water-based recording magenta ink composition in an amount of from 5 to 50% by weight, and more preferably from 5 to 30% by weight, for the same reason as explained above with respect to the content of the water-soluble organic solvent in the ink composition.

In the case when 1,5-pentanediol is used as the water-soluble organic solvent, the 1,5-pentanediol may preferably be contained in the water-based recording magenta ink composition in an amount of from 5 to 50% by weight, and more preferably from 5 to 30% by weight, for the same reason as explained above with respect to the content of the water-soluble organic solvent in the ink composition.

In the present invention, a conventional known water-soluble organic solvent(s) may be used in combination with at least one of 2-pyrrolidinone, β-thiodiglycol and 1,5-pentanediol so long as the benefits of the present invention is not damaged.

As the water used in combination with the water-soluble organic solvent described above, it is preferable not to use commonly available water containing various ions, but to use deionized water.

The content of the water in the recording water-based magenta ink composition may be determined within a vast range, depending on the type of the water-soluble organic solvent, the composition thereof and the desired properties of the water-based magenta ink composition, and may usually be within the range of from 10 to 95% by weight, preferably from 10 to 70% by weight, and more preferably from 20 to 70% by weight, based on the total weight of the ink composition.

The ink composition of the present invention is basically made up as described above. Besides, various conventionally known additives such as dispersants, surfactants, viscosity modifiers, surface tension modifiers, pH adjusters and antifungal agents may be optionally added. For example, viscosity modifiers such as polyvinyl alcohol, celluloses and water-soluble resins, surfactants of various types such as cationic, anionic and nonionic types, and pH adjusters such as diethanolamine and triethanolamine. When an ink composition is prepared which is used in an ink-jet recording process of the type a recording solution is charged, a specific resistance modifier including inorganic salts such as ammonium chloride is added.

The water-based magenta ink composition of the present invention can be produced by any conventional methods. For example, it can be produced by dissolving, with stirring, the magenta dye and other optional additives in the mixed solvent of water and at least one of 2-pyrrolidinone, β-thiodiglycol and 1,5-pentanediol, followed by filtration to remove undissolved matter.

The water-based recording magenta ink composition of the present invention, obtained in this way, has a superior liquid stability, can provide recorded images having a good color tone as magenta color, and also enables print with a sharp hue. Hence, it can be suited as ink compositions for ink-jet recording of various systems. Hence, an ink-jet recording process carried out using the water-based recording magenta ink composition of the present invention by jetting it to a recording medium (e.g., plain paper, coated paper, transparent film) in the form of droplets to make a record is embraced in the present invention as part thereof. In particular, the ink-jet recording process of the present invention can be preferably applied in the ink-jet recording system in which the water-based ink composition is jetted in the form of droplets by utilizing the vibration of a piezoelectric device and also in the ink-jet recording system in which the water-based ink composition is jetted in the form of droplets by utilizing the action of heat energy, the latter being easily affected by the formation of deposits. Thus, the process does not cause clogging at nozzles and in ink channels of the head of the recording apparatus, and also can form good recorded images.

EXAMPLES

The present invention will be described below in greater detail by giving Examples and Comparative Examples. The present invention is by no means limited to the following Examples.

Example 1

To 93 parts by weight of pure water, 2 parts by weight of Color Index Number Acid Red 52 and 5 parts by weight of 2-pyrrolidinone were added, and the mixture obtained was stirred for 30 minutes, followed by filtration with a membrane filter of 0.7 μm in pore diameter to obtain a magenta ink composition.

This ink composition was examined on the following evaluation items T1 to T4, and good results were obtained in all items as shown together below.

(T1) Liquid stability: The ink composition was hermetically enclosed in a heat-resistant glass bottle, and stored at −30° C. and 60° C. C for 6 months. Even after such storage, deposition of insoluble matter was not seen, and changes in liquid properties and color tone were also little seen.

(T2) Ejection stability: Using the shear mode type ink-jet recording head disclosed in Japanese Patent Application Laid-open No. 2-150355, the ink composition was continuously ejected in an atmosphere of 5° C., 20° C. and 40° C., for 24 hours for each. Always stable, high-quality recording was performed in all atmospheres.

(T3) Ejection response: Using the shear mode type ink-jet recording head disclosed in Japanese Patent Application Laid-open No. 2-150355, intermittent ejection at intervals of 1 minute and ejection after leaving for 2 months were examined. In both instances, no clogging occurred at the nozzles or ink channels of the ink-jet printer head, and stable and uniform recording was performed.

(T4) Quality of recorded images: Images recorded on the recording mediums shown below had a high density and were sharp, and magenta color with a good color tone was obtained.

Recording mediums:
"XEROX 4024", woodfree paper available from XEROX Corp.
"SEVEN STAR", woodfree paper available from Hokuetsu Seishi K.K.
"HAKUBOTAN", mechanical paper available from Honshu Paper Co., Ltd.
"TOYO ROSHI No.4", non-sized paper available from Toyo Roshi K.K.

Example 2

The procedure of Example 1 was repeated to produce a magenta ink composition, except that the 2-pyrrolidinone was added in an amount of 50% by weight. This ink composition was tested similarly, and, like Example 1, good results were obtained in all items.

Comparative Example 1

The procedure of Example 1 was repeated to produce a magenta ink composition, except that the 2-pyrrolidinone was not used. This ink composition was tested similarly. As a result, in T2 and in the intermittent ejection at intervals of 1 minute in T3, the ink often did not ejected. In T3, the head nozzles of the ink-jet printer clogged when the ink was used after leaving for 2 month. The head surface of the ink-jet printer was observed using an optical microscope to confirm that red substance was seen to have adhered.

Comparative Example 2

The procedure of Example 1 was repeated to produce a magenta ink composition, except that the 2-pyrrolidinone was used in an amount of 2 parts by weight. This ink composition was tested similarly. As a result, in T2 and in the intermittent ejection at intervals of 1 minute in T3, the ink often did not ejected. In T3, the head nozzles of the ink-jet printer clogged when the ink was used after leaving for 2 month. The head surface of the ink-jet printer was observed using an optical microscope to confirm that red substance was seen to have adhered.

Comparative Example 3

The procedure of Example 1 was repeated to produce a magenta ink composition, except that the 2-pyrrolidinone was used in an amount of 55 parts by weight. This ink composition was tested similarly. As a result, in T2 and T3, the ink did not well ejected and no good images were obtained.

Comparative Example 4

The procedure of Example 1 was repeated to produce a magenta ink composition, except that the 2-pyrrolidinone was replaced with ethylene glycol monomethyl ether. This ink composition was tested similarly. As a result, good results were obtained in T1 to T3. In T4, however, all images obtained had a tinge of pink in their color tone and no good magenta images were obtained.

In the ink compositions of Examples 1 and 2, which showed good ejection stability and ejection response and good liquid stability, sharpness and color tone, the Color Index Number Acid Red 52 was used as the magenta dye and also the 2-pyrrolidinone was contained in an amount of from 5 to 50% by weight.

On the other hand, in the ink compositions of Comparative Examples 1 to 4, which showed inferior ejection stability and ejection response or inferior liquid stability, sharpness and color tone, the ink composition did not fulfill the above conditions in all the cases.

Example 3

To 93 parts by weight of pure water, 2 parts by weight of Color Index Number Acid Red 52 and 5 parts by weight of β-thiodiglycol were added, and the mixture obtained was stirred for 30 minutes, followed by filtration with a membrane filter of 0.7 μm in pore diameter to obtain a magenta ink composition.

Like Example 1, this ink composition was examined on the following T1 to T4, and good results were obtained in all items as shown together below.

(T1) Liquid stability: The ink composition was hermetically enclosed in a heat-resistant glass bottle, and stored at −30° C. and 60° C. for 6 months. Even after such storage, deposition of insoluble matter was not seen, and changes in liquid properties and color tone were also little seen.

(T2) Ejection stability: Using the shear mode type ink-jet recording head disclosed in Japanese Patent Application Laid-open No. 2-150355, the ink composition was continuously ejected in an atmosphere of 5° C., 20° C. and 40° C., for 24 hours for each. Always stable, high-quality recording was performed in all atmospheres.

(T3) Ejection response: Using the shear mode type ink-jet recording head disclosed in Japanese Patent Application Laid-open No. 2-150355, intermittent ejection at intervals of 1 minute and ejection after leaving for 2 months were examined. In both instances, no clogging occurred at the nozzles or ink channels of the ink-jet printer head, and stable and uniform recording was performed.

(T4) Quality of recorded images: Images recorded on the recording mediums shown below had a high density and were sharp, and magenta color with a good color tone was obtained.

Recording mediums:

"XEROX 4024", woodfree paper available from XEROX Corp.

"SEVEN STAR", woodfree paper available from Hokuetsu Seishi K.K.

"HAKUBOTAN", mechanical paper available from Honshu Paper Co., Ltd.

"TOYO ROSHI No.4", non-sized paper available from Toyo Roshi K.K.

Example 4

The procedure of Example 3 was repeated to produce a magenta ink composition, except that the β-thiodiglycol was added in an amount of 50% by weight. This ink composition was tested similarly, and, like Example 3, good results were obtained in all items.

Comparative Example 5

The procedure of Example 3 was repeated to produce a magenta ink composition, except that the β-thiodiglycol was not used. This ink composition was tested similarly. As a result, in T2 and in the intermittent ejection at intervals of 1 minute in T3, the ink often did not ejected. In T3, the head nozzles of the ink-jet printer clogged when the ink was used after leaving for 2 month. The head surface of the ink-jet printer was observed using an optical microscope to confirm that red substance was seen to have adhered.

Comparative Example 6

The procedure of Example 3 was repeated to produce a magenta ink composition, except that the β-thiodiglycol was used in an amount of 2 parts by weight. This ink composition was tested similarly. As a result, in T2 and in the intermittent ejection at intervals of 1 minute in T3, the ink often did not ejected. In T3, the head nozzles of the ink-jet printer clogged when the ink was used after leaving for 2 month. The head surface of the ink-jet printer was observed using an optical microscope to confirm that red substance was seen to have adhered.

Comparative Example 7

The procedure of Example 3 was repeated to produce a magenta ink composition, except that the β-thiodiglycol was used in an amount of 55 parts by weight. This ink composition was tested similarly. As a result, in T2 and T3, the ink did not well ejected and no good images were obtained.

Comparative Example 8

The procedure of Example 3 was repeated to produce a magenta ink composition, except that the β-thiodiglycol was replaced with diethanolamine. This ink composition was tested similarly. As a result, good results were obtained in T1 to T3. In T4, however, all images obtained had a tinge of pink in their color tone and no good magenta images were obtained.

In the ink compositions of Examples 3 and 4, which showed good ejection stability and ejection response and good liquid stability, sharpness and color tone, the Color Index Number Acid Red 52 was used as the magenta dye and also the β-thiodiglycol was contained in an amount of from 5 to 50% by weight.

On the other hand, in the ink compositions of Comparative Examples 5 to 8, which showed inferior ejection stability and ejection response or inferior liquid stability, sharpness and color tone, the ink composition did not fulfill the above conditions in all the cases.

Example 5

To 93 parts by weight of pure water, 2 parts by weight of Color Index Number Acid Red 52 and 5 parts by weight of 1,5-pentanediol were added, and the mixture obtained was stirred for 30 minutes, followed by filtration with a membrane filter of 0.7 μm in pore diameter to obtain a magenta ink composition.

Like Example 1, this ink composition was examined on the following T1 to T4, and good results were obtained in all items as shown together below.

(T1) Liquid stability: The ink composition was hermetically enclosed in a heat-resistant glass bottle, and stored at −30° C. and 60° C. for 6 months. Even after such storage, deposition of insoluble matter was not seen, and changes in liquid properties and color tone were also little seen.

(T2) Ejection stability: Using the shear mode type ink-jet recording head disclosed in Japanese Patent Application Laid-open No. 2-150355, the ink composition was continuously ejected in an atmosphere of 5° C., 20° C. and 4° C., for 24 hours for each. Always stable, high-quality recording was performed in all atmospheres.

(T3) Ejection response: Using the shear mode type ink-jet recording head disclosed in Japanese Patent Application Laid-open No. 2-150355, intermittent ejection at intervals of 1 minute and ejection after leaving for 2 months were examined. In both instances, no clogging occurred at the nozzles or ink channels of the ink-jet printer head, and stable and uniform recording was performed.

(T4) Quality of recorded images: Images recorded on the recording mediums shown below had a high density and were sharp, and magenta color with a good color tone was obtained.

Recording mediums:

"XEROX 4024", woodfree paper available from XEROX Corp.

"SEVEN STAR", woodfree paper available from Hokuetsu Seishi K.K.

"HAKUBOTAN", mechanical paper available from Honshu Paper Co., Ltd.

"TOYO ROSHI No.4", non-sized paper available from Toyo Roshi K.K.

Example 6

The procedure of Example 5 was repeated to produce a magenta ink composition, except that the 1,5-pentanediol was added in an amount of 50% by weight. This ink composition was tested similarly, and, like Example 5, good results were obtained in all items.

Comparative Example 9

The procedure of Example 5 was repeated to produce a magenta ink composition, except that the 1,5-pentanediol was not used. This ink composition was tested similarly. As a result, in T2 and in the intermittent ejection at intervals of 1 minute in T3, the ink often did not ejected. In T3, the head nozzles of the ink-jet printer clogged when the ink was used after leaving for 2 month. The head surface of the ink-jet printer was observed using an optical microscope to confirm that red substance was seen to have adhered.

Comparative Example 10

The procedure of Example 5 was repeated to produce a magenta ink composition, except that the 1,5-pentanediol was used in an amount of 2 parts by weight. This ink composition was tested similarly. As a result, in T2 and in the intermittent ejection at intervals of 1 minute in T3, the ink often did not ejected. In T3, the head nozzles of the ink-jet printer clogged when the ink was used after leaving for 2 month. The head surface of the ink-jet printer was observed using an optical microscope to confirm that red substance was seen to have adhered.

Comparative Example 11

The procedure of Example 5 was repeated to produce a magenta ink composition, except that the 1,5-pentanediol was used in an amount of 55 parts by weight. This ink composition was tested similarly. As a result, in T2 and T3, the ink did not well ejected and no good images were obtained.

Comparative Example 12

The procedure of Example 5 was repeated to produce a magenta ink composition, except that the 1,5-pentanediol was replaced with 1-pentanol. This ink composition was tested similarly. As a result, good results were obtained in T1 to T3. In T4, however, all images obtained had a tinge of pink in their color tone and no good magenta images were obtained.

In the ink compositions of Examples 5 and 6, which showed good ejection stability and ejection response and good liquid stability, sharpness and color tone, the Color Index Number Acid Red 52 was used as the magenta dye and also the 1,5-pentanediol was contained in an amount of from 5 to 50% by weight.

On the other hand, in the ink compositions of Comparative Examples 9 to 12, which showed inferior ejection stability and ejection response or inferior liquid stability, sharpness and color tone, the ink composition did not fulfill the above conditions in all the cases.

The entire disclosures of Japanese Patent Applications No. 8-177724 filed on Jul. 8, 1996; No. 8-190335 filed on Jul. 19, 1996; and No. 8-194628 filed on Jul. 24, 1996 including specifications, claims and summaries are incorporated by reference in their entirety.

What is claimed is:

1. A water-based recording magenta ink composition comprising a magenta dye dissolved in a mixed solvent of water and a water-soluble organic solvent; wherein said magenta dye comprises Color Index Number Acid Red 52 and said water-soluble organic solvent comprises β-thiodiglycol and one or both of 2-pyrrolidinone and 1,5-pentanediol.

2. The water-based recording magenta ink composition according to claim 1, wherein said water-soluble organic solvent is contained in an amount of from 5% to 50% by weight in the water-based magenta ink composition.

3. The water-based recording magenta ink composition according to claim 2, wherein said water-soluble organic solvent is contained in an amount of from 5% to 30% by weight in the water-based magenta ink composition.

4. The water-based recording magenta ink composition according to claim 1, wherein said water-soluble organic solvent is 2-pyrrolidinone.

5. The water-based recording magenta ink composition according to claim 4, wherein said 2-pyrrolidinone is contained in an amount of from 5% to 50% by weight in the water-based magenta ink composition.

6. The water-based recording magenta ink composition according to claim 5, wherein said 2-pyrrolidinone is contained in an amount of from 5% to 30% by weight in the water-based magenta ink composition.

7. The water-based recording magenta ink composition according to claim 1, wherein said water-soluble organic solvent is β-thiodiglycol.

8. The water-based recording magenta ink composition according to claim 7, wherein said β-thiodiglycol is contained in an amount of from 5% to 50% by weight in the water-based magenta ink composition.

9. The water-based recording magenta ink composition according to claim 8, wherein said β-thiodiglycol is contained in an amount of from 5% to 30% by weight in the water-based magenta ink composition.

10. The water-based recording magenta ink composition according to claim 1, wherein said water-soluble organic solvent is 1,5-pentanediol.

11. The water-based recording magenta ink composition according to claim 10, wherein said 1,5-pentanediol is contained in an amount of from 5% to 50% by weight in the water-based magenta ink composition.

12. The water-based recording magenta ink composition according to claim 11, wherein said 1,5-pentanediol is contained in an amount of from 5% to 30% by weight in the water-based magenta ink composition.

13. The water-based recording magenta ink composition according to claim 1, wherein said Color Index Number Acid Red 52 is contained in an amount of from 0.1% to 5% by weight in the water-based magenta ink composition.

14. The water-based recording magenta ink composition according to claim 13, wherein said Color Index Number Acid Red 52 is contained in an amount of from 0.5% to 3% by weight in the water-based magenta ink composition.

15. The water-based recording magenta ink composition according to claim 1, wherein said water is deionized water.

16. The water-based recording magenta ink composition according to claim 1, wherein said water is contained in an amount of from 10% to 95% by weight in the water-based magenta ink composition.

17. An ink-jet recording process comprising jetting a water-based recording ink composition to a recording medium in the form of droplets to make a record, wherein said water-based recording ink composition comprises a water-based recording magenta ink composition comprising a magenta dye dissolved in a mixed solvent of water and a water-soluble organic solvent; said magenta dye comprising Color Index Number Acid Red 52 and said water-soluble organic solvent comprising β-thiodiglycol and one or both of 2-pyrrolidinone and 1,5-pentanediol.

18. The ink-jet recording process according to claim 17, wherein said ink composition is jetted in the form of droplets by utilizing the vibration of a piezoelectric device.

19. The ink-jet recording process according to claim 17, wherein said ink composition is jetted in the form of droplets by the action of heat energy.

* * * * *